Patented Mar. 7, 1944

2,343,462

UNITED STATES PATENT OFFICE 2,343,462

PURIFICATION OF HYDROCHLORIC ACID

Robert F. Laird, Salem, and Rufus G. Hartig, Penns Grove, N. J., assignors to Kinetic Chemicals, Inc., Wilmington, Del., a corporation of Delaware No Drawing. Application May 2, 1942, Serial No. 441,552

4 Claims. (Cl. 23—154)

This invention relates to the separation of hydrofluoric acid and its soluble salts from hydrochloric acid. The process has particular application to the separation of aqueous hydrochloric acid from soluble fluorides by distillation.

A process is described in U. S. application Serial No. 266,070 for the separation of HCl and HF by the distillation of their aqueous solution or by preferential absorption of HF in aqueous HCl. That useful process has this imperfection that the HF is sufficiently volatile to be carried over in considerable amounts with the distilling HCl.

It is an object of our invention to improve the process of separating HCl from HF and soluble fluorides.

The objects of the invention are accomplished, generally speaking, by carrying out the distillation of an aqueous solution containing HCl, and HF or a soluble fluoride in the presence of boric acid or a soluble borate.

The invention is, in its greatest scope, applicable to the separation of HF and soluble fluorides from HCl. The invention appears to depend upon depressing the volatility of the HF or soluble fluorides by the action of the boric acid or soluble borate. In other words, the presence in the ebullient mixture of boric acid or a soluble borate emphasizes the distillation differential of the halogenic ingredients.

The following examples illustrate the invention. The proportions thereof are exemplary and do not constitute limitations except where it is specifically so stated. Parts are by weight unless otherwise stated. The "enrichment ratio" is the comparison of the amount of HF or soluble fluoride in the original liquid to the amount found in the distillate, the "enrichment" referring to the enrichment of the original liquid by the fluorides which are left in it after distillation.

EXAMPLE I

A 34.8% solution of hydrochloric acid containing 0.97% hydrogen fluoride (based on 100% HCl) was treated with 1.05 moles of boric acid, $H_3BO_3$, per mole of hydrogen fluoride. The solution was distilled, and the vapor absorbed in 12% sodium hydroxide solution. The resulting solution was titrated for fluorides and found to contain 0.003% as HF (based on 100% HCl).

The enrichment ratio, or ratio of fluoride in the original liquid to the fluoride in the distillate, was 320 to 1.

Similar experiments were carried out, using various concentrations of hydrochloric acid and hydrogen fluoride, and boric acid with the following results:

Table 1

| Per cent HCl | Total fluorides as HF (100% HCl basis) | Moles $H_3BO_3$ per mole HF | Total fluorides as HF (100% HCl basis) in distillate | Enrichment ratio |
|---|---|---|---|---|
| 22.0 | 3.3 | None | 6.0 | 0.56 |
| 34.6 | 0.033 | None | 0.007 | 4.5 |
| 35.5 | 0.015 | None | 0.004 | 4 |
| 32.0 | 0.23 | None | 0.40 | 0.6 |
| 32.0 | 0.23 | 1.1 | 0.019 | 12 |
| 35.6 | 0.93 | 0.33 | 0.010 | 95 |
| 19.8 | 9.8 | 0.37 | 0.28 | 35 |
| 34.8 | 0.97 | 1.05 | 0.003 | 320 |
| 34.3 | 10.1 | 1.1 | 0.003 | 3,000 |
| 22.0 | 9.9 | 1.1 | 0.10 | 95 |

EXAMPLE II

A solution containing 35.7% hydrochloric acid plus 1.31% fluorides (calculated as HF on 100% HCl basis) was treated with 1.1 moles of boric acid per mole of F. The fluorides were principally present as fluosilicic acid, $H_2SiF_6$. The solution was distilled, and analysis of the distillate yielded 0.009 weight per cent fluorides (as HF on 100% HCl basis), or an enrichment ratio of 150 to 1. A similar solution containing 1.0% fluoride (calculated as HF on 100% HCl basis) was distilled without the addition of boric acid. An enrichment ratio of 0.39 was obtained.

EXAMPLE III

Thirty-five per cent hydrochloric acid containing 0.06% fluorides (calculated as HF on 100% HCl basis, but consisting of silicon tetrafluoride, fluosilicic acid, hydrofluoric acid and some fluorides of unknown composition) was treated with 1.1 moles of boric acid per mole of fluoride. The solution was stripped in a packed column until a constant boiling mixture was obtained. The vapors were absorbed in 12% sodium hydroxide and analyzed. The constant boiling mixture in the boiler was treated in an absorption column with hydrogen chloride gas containing varying amounts of fluorides in the neighborhood of 0.04%, calculated as HF 100%, HCl basis). The composition of the fluorides was the same as stated previously.

This enriched acid was treated with 1.1 moles of boric acid per mole of fluorine added with the acid gas, and stripped as before. This process was repeated until five cycles had been completed. The vapors from the distillation averaged 0.005% fluorides, calculated as HF (100% HCl basis), while the fluorides in the liquid built up to 0.20%, calculated in the same manner.

An enrichment ratio of 40 to 1, maximum, was obtained. In distilling similar acid without the addition of boric acid, an enrichment ratio of 0.76 was obtained.

From the examples cited, it can be seen that the use of boric acid for the reduction of fluoride volatility in hydrogen chloride is advantageous over a wide range of concentrations. A preferred concentration range, however, is between 21% and 37% HCl; and a preferred HF range is up to 10% on a 100% HCl basis. In this invention boric acid can also be added in the form of its salts, which will give the free acid in the presence of mineral acids.

Alternate absorption and stripping operations may be carried on simultaneously so that impure gaseous hydrogen chloride can be continuously purified. Continuous feeding and removal from the still pot may be effected, or impure hydrogen chloride gas may be bubbled through a hot boric acid solution which is continuously removed and replaced with fresh solution.

This invention may be used as a preliminary to further purification of hydrochloric acid, removing the bulk of the volatile fluorides before finer treatment, or it may constitute a complete treatment in itself.

As many apparently widely different embodiments of this invention may be made without departing from the spirit and scope thereof, it is to be understood that we do not limit ourselves to the specific embodiments thereof except as defined in the appended claims.

We claim:

1. The process which comprises separating HCl from a solution containing at least one of a group consisting of HF and the soluble fluorides at least part of which is in the form of fluosilicic acid, which comprises distilling the solution in the presence of boric acid.

2. The process of separating HCl from at least one of a group consisting of HF and the volatile fluorides in solution which comprises distilling the HCl from the mixture in the presence of one of a group consisting of boric acid and soluble borates.

3. The process of increasing the relative distillation rates of HCl with respect to at least one of a group consisting of HF and volatile fluorides in solution which comprises adding to the solution at least one of a group consisting of boric acid and a soluble borate.

4. In the process of separating at least one of a group consisting of HF and soluble fluorides from HCl, the step which comprises distilling one from the other in the presence of at least one of a group consisting of boric acid and the soluble borates.

ROBERT F. LAIRD.
RUFUS G. HARTIG.

CERTIFICATE OF CORRECTION.

Patent No. 2,343,462. March 7, 1944.

ROBERT F. LAIRD, ET AL.

It is hereby certified that error appears in the printed specification of the above numbered patent requiring correction as follows: Page 1, second column, line 50, for "100%," read --(100%--; and that the said Letters Patent should be read with this correction therein that the same may conform to the record of the case in the Patent Office.

Signed and sealed this 16th day of May, A. D. 1944.

Leslie Frazer (Seal) Acting Commissioner of Patents.